Patented Dec. 19, 1933

1,940,280

UNITED STATES PATENT OFFICE 1,940,280

RUBBER VULCANIZATION

Ira Williams and Arthur M. Neal, Wilmington, Del., assignors to E. I. du Pont de Nemours & Company, Wilmington, Del., a corporation of Delaware No Drawing. Application January 15, 1930
Serial No. 421,062

16 Claims. (Cl. 18—53)

This invention relates to the manufacture of rubber, specifically to the acceleration of the process of vulcanization and to the production of an increase in the tensile strength of the resulting product. More particularly it contemplates the simultaneous use of two vulcanization accelerators, one of which is a substituted ammonium salt.

It is not new to use nitrogenous compounds as accelerators as is evidenced by U. S. P. 1,434,909, of November 7, 1922, to Morton, nor is it new to use nitrogenous bodies in connection with other organic substances for this constituted the improvement in U. S. P. 1,467,197, of September 4, 1923, to Russell. So far as the applicants are aware, however, the simultaneous use of organic accelerators of two distinct classes, one of which is a substituted ammonium salt, is not known in the art.

This invention has for an object a decrease in the time of vulcanization. Another object is an increase in the tensile strength of the vulcanized product. Still other objects are to secure a wide range of cure, to satisfactorily vulcanize with smaller amounts of known accelerators, to make more efficient use of weak accelerators and to use in the acceleration of vulcanization, materials not heretofore used, and in general to overcome the objections of the prior art. Other objects will appear hereinafter.

These objects are accomplished by the present invention whereby vulcanization is carried out upon a suitable composition or mixture containing, or in the presence of, both a substituted ammonium salt and an organic accelerator of a different class.

The substituted ammonium salts are in themselves weak accelerators of vulcanization but are not sufficiently active to be of commercial importance. The ammonium salts which are used as accelerators are the products which would result from the addition of an acid to an organic compound containing a trivalent nitrogen to which not more than two hydrogen atoms are attached. They would have the probable formula

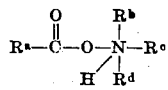

in which $R^a$ is an alkyl or aryl group and $R^b$ and $R^c$ represent an alkyl group of hydrogen and $R^d$ represents an alkyl or aryl group. While aromatic amines may be used, those amines which have no aromatic group directly connected to the nitrogen have so far been found to be preferable for the formation of the salt. Compounds such as methyl amine, benzylamine, dibutyl amine, trimethyl amine, piperidine and methyl propylamine are examples of nitrogen compounds well suited to the production of substituted ammonium salts. Inorganic acids, for example hydrochloric, are of value, but the type of acid which is preferred is the mono basic organic acid. The aliphatic acids of low molecular weight, but containing more than one carbon atom, such as acetic and butyric acids, are especially desirable. Some of the substituted ammonium salts which are suitable accelerators are dimethyl ammonium acetate, dimethyl ammonium oleate, methyl ammonium butyrate, butyl ammonium acetate, piperidine butyrate, pyridine butyrate, triethanol ammonium acetate, butyl ammonium chloride, aniline benzoate, dibutyl ammonium oleate, dibutyl ammonium acetate, and butyl ammonium oleate.

The accelerating action of some of the materials just mentioned is shown in Table 1. The test formula consists of 100 parts of rubber, 25 parts of carbon black, 5 parts of zinc oxide, 3 parts of sulfur and 3 parts of accelerator.

Table 1

|  | Tensile strength pounds/sq. in. when vulcanized at 287° F. for | | | | |
| --- | --- | --- | --- | --- | --- |
|  | 15 min. | 20 min. | 30 min. | 45 min. | 60 min. |
| No accelerator used | | | | | 100 |
| Dimethyl ammonium acetate | | 1900 | 2250 | 2550 | 2800 |
| Dimethyl ammonium oleate | | 650 | 1275 | 1600 | 1750 |
| Methyl ammonium butyrate | | 3400 | 3600 | 3975 | 3475 |
| Butyl ammonium acetate | 2775 | 2825 | 3300 | 3800 | 3625 |
| Piperidine butyrate | | 3050 | 3975 | 4000 | 4100 |
| Pyridine butyrate | | 1175 | 1550 | 2425 | 2550 |
| Tryethanol ammonium acetate | | 1350 | 1350 | 1975 | 2175 |
| Butyl ammonium chloride | | 2000 | 2550 | 2825 | 2750 |
| Aniline benzoate | | | | 300 | 700 |

The accelerators with which these ammonium salts are used should be of a different type or class of accelerating compounds. So far the best results have not been obtained when two different ammonium salts are used as the two accelerators. Up to now the best results obtained have been with the use of a substituted ammonium salt and an accelerator belonging to a class of the group guanidines, thioureas, mercaptothiazoles, dithiocarbamates, thiuram disulfides, thiuram monosulfides and thio acids. Of this group those having the linkage

namely the mercapto-benzothiazoles having the formula

the di-thio-carbamates having the formula

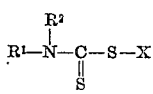

X being a metal, alkyl, aryl or salt forming radical such as ammonium, the thiuram-mono-sulphides having the formula

and the thiuram-di-sulphides having the formula

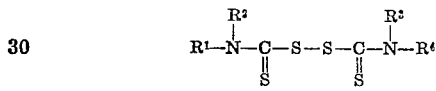

in which $R^1$, $R^2$, $R^3$ and $R^4$ represent aliphatic radicals, or in which $R^1$ and $R^4$ represent aliphatic radicals while $R^2$ and $R^3$ represent aryl radicals, merit special mention. The increase in accelerating value obtained by using a combination of a substituted ammonium salt and an aldehyde amine accelerator is in general less pronounced than that obtained by using combinations involving a substituted ammonium salt and a member of the other classes named.

By combining the action of ammonium salt with that of a second organic accelerator, the accelerating action is unexpectedly increased beyond that which would be expected from the mere combined use of the two substances and in most cases the range of useful cures becomes greater than when either of the accelerating materials is used alone. For instance, the use of 1.5 parts of butyl ammonium acetate or 1 part of thiocarbanilide as accelerator produces rubber of little or no commercial value, while the combined action produces a product of high tensile strength. The action referred to is further illustrated by the following examples showing the separate use and simultaneous use of accelerating materials according to this invention. It will be noted that the results of simultaneous use are better than the sum of the separate use results.

*Example I*

The use of butyl-ammonium-acetate and tetra-methyl-thiuram-disulfide.

*Table 2*

| Compound | #163 | #185E | #163A |
|---|---|---|---|
| Rubber | 100 | 100 | 100 |
| Carbon black | 25 | 25 | 25 |
| Zinc oxide | 5 | 5 | 5 |
| Sulfur | 3 | 3 | 3 |
| Butyl ammonium acetate | | 1.5 | 1.5 |
| Tetra methyl thiuram disulfide | .2 | | .2 |

*Table 3*

Tensil strength at break when vulcanized at 259°, tensile strength at break in pounds/sq. in.

| Minutes cure | #163 | #185E | #163A |
|---|---|---|---|
| 15 | 2000 | 1750 | 4100 |
| 20 | 2250 | 1750 | 4800 |
| 30 | 2225 | 1650 | 4800 |

*Example II*

The use of dibutyl-ammonium-oleate and tetra-methyl-thiuram-monosulfide

*Table 4*

| Compound | #185C | #185D | #185B |
|---|---|---|---|
| Rubber | 100 | 100 | 100 |
| Carbon black | 25 | 25 | 25 |
| Zinc oxide | 5 | 5 | 5 |
| Sulfur | 3 | 3 | 3 |
| Dibutyl ammonium oleate | | 1 | 1 |
| Tetra methyl thiuram mono sulfide | .2 | | .2 |

*Table 5*

Tensile strength at break when vulcanized at 259° F., tensile strength at break in pounds/sq. in.

| Minutes cure | #185C | #185D | #185B |
|---|---|---|---|
| 15 | 2125 | Not cured. | 4550 |
| 20 | 2450 | Not cured. | 5025 |
| 30 | 2375 | 425 | 4750 |

*Example III*

The use of butyl ammonium acetate and thiocarbanilide

*Table 6*

| Compound | #19A | #185A | #185 |
|---|---|---|---|
| Rubber | 100 | 100 | 100 |
| Carbon black | 25 | 25 | 25 |
| Zinc oxide | 5 | 5 | 5 |
| Sulfur | 3 | 3 | 3 |
| Butyl ammonium acetate | | 1 | 1 |
| Thio carbanilide | 1 | | 1 |

*Table 7*

Tensile strength when vulcanized at 287° F., tensile strength at break in pounds/sq. in.

| Minutes cure | #19A | #185A | #185 |
|---|---|---|---|
| 15 | No cure. | 1100 | 1775 |
| 20 | No cure. | 1300 | 1900 |
| 30 | No cure. | 1400 | 1850 |
| 45 | No cure. | 1725 | 2050 |

*Example IV*

The result of combining the action of butyl ammonium acetate and tetra-methyl-thiuram-disulfide is illustrated by the following data. The compounds tested are shown in Table 8.

*Table 8*

| Compound | #1 | #2 | #3 |
|---|---|---|---|
| Smoked sheets | 100 | 100 | 100 |
| Carbon black | 25 | 25 | 25 |
| Zinc oxide | 5 | 5 | 5 |
| Sulfur | 3 | 3 | 3 |
| Tetra methyl thiuram disulfide | .2 | .2 | .1 |
| Butyl ammonium acetate | | 1.5 | 1.5 |

These compounds were vulcanized in the press at 259° F. for various times and the tensile strength determined with the results shown in Table 9.

Table 9

| Minutes cure at 259° F. | Tensile strength at break in pounds/sq. in. | | |
|---|---|---|---|
| | #1 | #2 | #3 |
| 10 | 1950 | 4100 | 1800 |
| 15 | 2000 | 4100 | 2200 |
| 20 | 2250 | 4800 | 2610 |
| 30 | 2225 | 4800 | 3350 |

Compound #2 shows the improvement in physical properties obtained by the combined action of the two accelerators while compound #3 shows the reduction in the amount of tetra methyl thiuram disulfide which can be made without reducing the physical properties below those shown by compound #1.

Example V

The results obtained by combining the action of piperidine butyrate and thio carbanilide are shown by the following data. The compounds tested are shown in Table 10 and the resulting tensile strength is shown in Table 11.

Table 10

| Compound | #4 | #5 |
|---|---|---|
| Smoked sheets | 100 | 100 |
| Carbon black | 25 | 25 |
| Zinc oxide | 5 | 5 |
| Sulfur | 3 | 3 |
| Thio carbanilide | 1 | 1 |
| Piperidine butyrate | | 1.5 |

Table 11

| Minutes cure at 287° F. | Tensile strength at break in pounds/sq. in. | |
|---|---|---|
| | #4 | #5 |
| 20 | | 1925 |
| 30 | | 2100 |
| 45 | | 2850 |
| 90 | 500 | 2925 |

Example VI

The results obtained by combining the accelerating action of methyl ammonium butyrate and diphenyl guanidine are shown in Table 12 and Table 13.

Table 12

| Compound | #6 | #7 |
|---|---|---|
| Smoked sheets | 100 | 100 |
| Carbon black | 25 | 25 |
| Zinc oxide | 5 | 5 |
| Sulfur | 3 | 3 |
| Diphenyl guanidine | 1 | 1 |
| Methyl ammonium buyrate | | 1.5 |

Table 13

| Minutes cure at 287° F. | Tensile strength at break in pounds/sq. in. | |
|---|---|---|
| | #6 | #7 |
| 30 | 3000 | 3250 |
| 45 | 3200 | 3850 |
| 60 | 3100 | 4000 |

Example VII

The results obtained by combining the action of butyl ammonium acetate and mercaptobenzothiazole are shown in Tables 14 and 15.

Table 14

| Compound | #8 | #9 |
|---|---|---|
| Smoked sheets | 100 | 100 |
| Carbon black | 25 | 25 |
| Zinc oxide | 5 | 5 |
| Sulfur | 3 | 3 |
| Stearic acid | 3 | |
| Mercaptobenzothiazole | .5 | .5 |
| Butyl ammonium acetate | | 1.5 |

Table 15

| Minutes cure at 287° F. | Tensile strength at break in pounds/sq. in. | |
|---|---|---|
| | #8 | #9 |
| 15 | 2750 | 4825 |
| 20 | 3200 | 4500 |
| 30 | 3150 | 4300 |
| 45 | 3250 | 3750 |

Example VIII

The results of using dibutyl-ammonium-oleate and mercaptobenzothiazole are shown in Tables 16 and 17.

Table 16

| Compound | #10 | #11 |
|---|---|---|
| Smoked sheets | 100 | 100 |
| Carbon black | 25 | 25 |
| Zinc oxide | 5 | 5 |
| Sulfur | 3 | 3 |
| Stearic acid | 3 | |
| Mercaptobenzothiazole | .5 | |
| Dibutyl ammonium oleate | | 1.5 |

Table 17

| Minutes cure at 287° | Tensile strength at break in pounds/sq. in. | |
|---|---|---|
| | #10 | #11 |
| 15 | 2750 | 4575 |
| 20 | 3200 | 3800 |
| 30 | 3150 | 3875 |

Example IX

In connection with Tables 14, 15, 16 and 17 immediately preceding, the following example is given to show that the amount of mercaptobenzothiazole may be decreased without detrimentally affecting the properties of the resulting product or the time of vulcanization.

Table 18

| Compound | #103 | #68 | #80 | #106 | #114A |
|---|---|---|---|---|---|
| Rubber | 100 | 100 | 100 | 100 | 100 |
| Carbon black | 25 | 25 | 25 | 25 | 25 |
| Zinc oxide | 5 | 5 | 5 | 5 | 5 |
| Sulfur | 3 | 3 | 3 | 3 | 3 |
| Stearic acid | | 3 | 3 | | |
| Mercaptobenzothiazole | .5 | .5 | .5 | .25 | .15 |
| Butyl ammonium acetate | | | 1.5 | 1.5 | 1.5 |

Table 19

| Minutes cure at 287° F. | Tensile strength at break in pounds/sq. in. | | | | |
|---|---|---|---|---|---|
| | #103 | #68 | #80 | #106 | #114A |
| 15 | 1200 | 3000 | 4825 | 3850 | 3475 |
| 20 | 1900 | 2750 | 4500 | 3650 | 3475 |
| 30 | 1375 | 3000 | 4300 | 3500 | 3600 |

While the above invention has been described in connection with rubber, it is to be understood that the invention is not limited to any one type or class of rubber or even to natural rubber itself, because synthetic rubber, gutta percha, balata and the like may be treated advantageously. In certain instances it may be desirable to use a substitute for the zinc oxide, for example, cadmium oxide.

Furthermore, it is to be understood that the present invention is not limited to any specific method of applying these substituted ammonium salts to the rubber. While the material will ordinarily be milled into the rubber in the usual manner it is possible to add the acid and the amine separately on the mixing mill, or it is possible to diffuse either one or both into the rubber after mixing and secure the same beneficial results, however any desired mixing process may be used.

As stated and shown above the use of these materials results in unexpected increase in accelerating activity and tensile strength of the product. The use of these substituted ammonium bases with many of the high priced accelerators permits of a decrease in the amount of accelerator and produces the same physical results at a lower cost.

As many apparently widely different embodiments of this invention may be made without departing from the spirit and scope thereof, it is to be understood that we do not limit ourselves to the specific embodiments thereof except as defined in the appended claims.

We claim:

1. In the process of vulcanizing rubber the step of adding to the rubber a small amount of butyl substituted ammonium acetate and a member of the group consisting of tetra-methyl-thiuram-monosulfide and mercaptobenzothiazole.

2. The product resulting from vulcanizing rubber containing a small amount of di-butyl substituted ammonium acetate and a member of the group consisting of tetra-methyl-thiuram-monosulfide and mercaptobenzothiazole.

3. In the process of accelerating the vulcanization of rubber the step of adding to the rubber a small amount of a butyl-ammonium-acetate and an organic accelerator of a different class.

4. In the process of accelerating the vulcanization of rubber the step of adding to the rubber a small amount of a dibutyl-ammonium-oleate and a member of the group consisting of tetra-methyl-thiuram-monosulfide and mercaptobenzothiazole.

5. The process of vulcanizing rubber substances which consists in mixing with the rubber substances the vulcanizing ingredients and two organic accelerators, one of which is a di-butyl ammonium salt and then heating to effect vulcanization.

6. The process of vulcanizing rubber substances which consists in mixing with the rubber substances, the vulcanizing ingredients and small amounts of an organic accelerator and a butyl ammonium salt and then heating to effect vulcanization.

7. The method of improving rubber and/or expediting the vulcanization thereof comprising the addition of a butyl substituted ammonium salt and a member of the group mercaptothiazoles, dithiocarbamates, thiuram disulfides, and thiuram monosulfides.

8. The method of improving rubber and/or expediting the vulcanization thereof comprising the addition of a butyl substituted ammonium salt and an organic accelerator containing the grouping

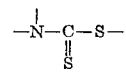

9. The method of improving rubber and/or expediting the vulcanization thereof comprising the addition of a di-butyl substituted ammonium salt and an organic accelerator containing the grouping

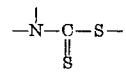

10. In the process of vulcanizing rubber the step of adding to the rubber a small amount of a butyl substituted ammonium acetate and an organic accelerator of a different class.

11. In the process of vulcanizing rubber the step of adding to the rubber a small amount of tetra-methyl-thiuram-sulfide and a member of the group consisting of butyl ammonium acetate, di-butyl ammonium acetate, butyl ammonium oleate and di-butyl ammonium oleate.

12. In the process of vulcanizing rubber the step of adding to the rubber a small amount of mercaptobenzothiazole and a member of the group consisting of butyl ammonium acetate, di-butyl ammonium acetate, butyl ammonium oleate, and di-butyl ammonium oleate.

13. In the process of vulcanizing rubber the step which comprises adding to the rubber a small amount of a member of the group consisting of mercaptothiazoles, dithiocarbamates and thiuram sulfides and a salt of a base of the group consisting of methylamine, benzylamine, dibutylamine, trimethylamine, piperidine and methyl propylamine and an acid of the group consisting of acetic acid, butyric acid, and oleic acid.

14. In the process of vulcanizing rubber the step which comprises adding to the rubber a small amount of a member of the group consisting of mercaptothiazoles, dithiocarbamates and thiuram sulfides and a member of the group consisting of dimethyl ammonium acetate, dimethyl ammonium oleate, methyl ammonium butyrate, butyl ammonium acetate, piperidine butyrate, pyridine butyrate, triethanol ammonium acetate, butyl ammonium chloride, aniline benzoate, dibutyl ammonium oleate, dibutyl ammonium acetate and butyl ammonium oleate.

15. In the process of vulcanizing rubber, the step of adding to the rubber, prior to vulcanization, a small amount of a salt of a base of the group consisting of methylamines, ethylamines, propylamines, butylamines, methyl-propyl amine, benzylamines, piperidine and pyridine and a mono-basic aliphatic acid of a strength equal to or less than acetic acid and an accelerator of a different class.

16. In the process of vulcanizing rubber, the step of adding to the rubber, prior to vulcanization, a small amount of a salt of a base of the group consisting of methylamines, ethylamines, propylamines, butylamines, methyl-propyl amine, benzylamines, piperidine and pyridine and an acid of the group consisting of acetic acid, butyric acid and oleic acid and an accelerator of a different class.

ARTHUR M. NEAL.
IRA WILLIAMS.